(12) United States Patent
Kitamura et al.

(10) Patent No.: US 9,045,643 B2
(45) Date of Patent: *Jun. 2, 2015

(54) BRIGHT PIGMENT, METHOD FOR PRODUCING THE PIGMENT, AND WATERBORNE RESIN COMPOSITION CONTAINING THE PIGMENT

(75) Inventors: Takeaki Kitamura, Tokyo (JP); Yusuke Kimura, Tokyo (JP)

(73) Assignee: Nippon Sheet Glass Company Limited, Tokyo (JP)

( * ) Notice: Subject to any disclaimer, the term of this patent is extended or adjusted under 35 U.S.C. 154(b) by 1304 days.

This patent is subject to a terminal disclaimer.

(21) Appl. No.: 12/226,507

(22) PCT Filed: Apr. 23, 2007

(86) PCT No.: PCT/JP2007/058771
§ 371 (c)(1),
(2), (4) Date: Oct. 20, 2008

(87) PCT Pub. No.: WO2007/123231
PCT Pub. Date: Nov. 1, 2007

(65) Prior Publication Data
US 2010/0137488 A1 Jun. 3, 2010

(30) Foreign Application Priority Data
Apr. 21, 2006 (JP) .................. 2006-118250

(51) Int. Cl.
*C09C 1/00* (2006.01)
*C09D 5/02* (2006.01)
(Continued)

(52) U.S. Cl.
CPC .......... *C09C 1/0015* (2013.01); *C01P 2006/62* (2013.01); *C01P 2006/63* (2013.01);
(Continued)

(58) Field of Classification Search
CPC ............. C01P 2006/62; C01P 2006/63; C01P 2006/64; C01P 2006/65; C08K 3/22; C08K 3/34; C08K 3/40; C08K 9/02; C09C 1/0015; C09C 2200/1008; C09C 2200/1025; C09C 2200/301; C09C 2200/401; C09C 2210/50
USPC .................................................. 106/403, 415
See application file for complete search history.

(56) References Cited

U.S. PATENT DOCUMENTS 3,370,971 A  2/1968 Linton
3,391,995 A  7/1968 Bernhard et al.
(Continued)

FOREIGN PATENT DOCUMENTS

DE  24 29 762  1/1976
DE  41 38 376  9/1993
(Continued)

OTHER PUBLICATIONS

Sun, et al., "Preparation and Characterization of the Mica Titanium Optical Interferential Pigment Coated by $Nd_2O_3$", Bulletin of the Chinese Ceramic Society, vol. 25, No. 6, Dec. 2006—5 pages.
(Continued)

*Primary Examiner* — Shuangyi Abu Ali
(74) *Attorney, Agent, or Firm* — Hamre, Schumann, Mueller & Larson, P.C.

(57) ABSTRACT

A bright pigment of the present invention includes a scaly inorganic base 10, a silver-containing coating 11 that covers the inorganic base 10 and contains silver or a silver alloy, and a yellowing-suppressing coating 2 that covers the inorganic base 10 from outside of the silver-containing coating 11 and contains a metal compound functioning as an oxidizing agent. The metal compound is preferably at least one selected from the group consisting of a hydroxide of metal, an oxide hydrate of metal, and a salt of an oxide hydrate of metal, and the metal is at least one selected from the group consisting of tungsten, molybdenum, bismuth, vanadium, or cerium.

17 Claims, 2 Drawing Sheets

(51) Int. Cl.

| | | |
|---|---|---|
| *C09D 5/29* | (2006.01) | |
| *C09D 5/36* | (2006.01) | |
| *C09D 7/12* | (2006.01) | |
| *C09D 11/037* | (2014.01) | |
| *C09D 11/50* | (2014.01) | |
| C08K 3/22 | (2006.01) | |
| C08K 3/34 | (2006.01) | |
| C08K 3/40 | (2006.01) | |
| C08K 9/02 | (2006.01) | |

(52) U.S. Cl.
 CPC ......... C01P2006/64 (2013.01); C01P 2006/65 (2013.01); C08K 3/22 (2013.01); C08K 3/34 (2013.01); C08K 3/40 (2013.01); C08K 9/02 (2013.01); C09C 2200/1008 (2013.01); C09C 2200/1025 (2013.01); C09C 2200/301 (2013.01); C09C 2200/401 (2013.01); C09C 2210/50 (2013.01); C09C 2220/10 (2013.01); C09C 2220/20 (2013.01); *C09D 5/028* (2013.01); *C09D 5/29* (2013.01); *C09D 5/36* (2013.01); *C09D 7/1225* (2013.01); *C09D 11/037* (2013.01); *C09D 11/50* (2013.01)

(56) References Cited

U.S. PATENT DOCUMENTS

| | | | |
|---|---|---|---|
| 3,483,009 A | 12/1969 | Willis | |
| 3,497,374 A | 2/1970 | Nix | |
| 3,545,994 A | 12/1970 | Lott | |
| 3,585,160 A | 6/1971 | Miller et al. | |
| 3,711,433 A | 1/1973 | Willey et al. | |
| 4,084,983 A | 4/1978 | Bernhard et al. | |
| 4,239,548 A * | 12/1980 | Barnard et al. | 106/439 |
| 4,375,373 A * | 3/1983 | Abe et al. | 106/403 |
| 4,544,415 A | 10/1985 | Franz et al. | |
| 5,183,504 A | 2/1993 | Kuwajima et al. | |
| 5,223,034 A | 6/1993 | Nitta et al. | |
| 5,423,912 A | 6/1995 | Sullivan et al. | |
| 5,436,077 A | 7/1995 | Matsuba et al. | |
| 5,472,491 A | 12/1995 | Duschek et al. | |
| 5,472,734 A | 12/1995 | Perrotta et al. | |
| 5,668,077 A | 9/1997 | Klopries et al. | |
| 5,734,068 A | 3/1998 | Klopries et al. | |
| 5,753,371 A | 5/1998 | Sullivan et al. | |
| 5,759,255 A | 6/1998 | Venturini et al. | |
| 5,874,072 A | 2/1999 | Alwattari et al. | |
| 5,958,125 A * | 9/1999 | Schmid et al. | 106/417 |
| 5,985,258 A | 11/1999 | Alwattari et al. | |
| 6,033,466 A | 3/2000 | Ito | |
| 6,267,810 B1 | 7/2001 | Pfaff et al. | |
| 6,348,533 B1 | 2/2002 | Kishimoto et al. | |
| 6,488,867 B1 | 12/2002 | Matsumoto et al. | |
| 6,491,932 B1 | 12/2002 | Ramin et al. | |
| 6,533,858 B1 | 3/2003 | Cacace et al. | |
| 6,620,868 B1 | 9/2003 | Wilke | |
| 6,630,018 B2 * | 10/2003 | Bauer et al. | 106/415 |
| 6,783,584 B2 | 8/2004 | Takahashi | |
| 6,821,333 B2 | 11/2004 | Zimmermann et al. | |
| 6,929,690 B2 * | 8/2005 | Vogt et al. | 106/403 |
| 7,413,599 B2 * | 8/2008 | Henglein et al. | 106/415 |
| 8,088,211 B2 * | 1/2012 | Hashizume et al. | 106/404 |
| 2002/0031534 A1 | 3/2002 | Horino | |
| 2002/0064664 A1 | 5/2002 | Kishimoto et al. | |
| 2002/0096087 A1 | 7/2002 | Glausch | |
| 2003/0105201 A1 | 6/2003 | Auschra et al. | |
| 2003/0129149 A1 | 7/2003 | Pike et al. | |
| 2003/0166755 A1 | 9/2003 | Muhlebach et al. | |
| 2004/0134385 A1 | 7/2004 | Anselmann et al. | |
| 2004/0143032 A1 | 7/2004 | Auschra et al. | |
| 2004/0191198 A1 | 9/2004 | Hochstein et al. | |
| 2005/0004317 A1 | 1/2005 | Auschra et al. | |
| 2005/0014865 A1 | 1/2005 | Bagala et al. | |
| 2005/0257716 A1 | 11/2005 | Mazzella et al. | |
| 2006/0155007 A1 | 7/2006 | Huber | |
| 2006/0159634 A1 | 7/2006 | Heinrichs | |
| 2006/0159635 A1 | 7/2006 | Meyer et al. | |
| 2006/0223910 A1 | 10/2006 | Bagala | |
| 2007/0015012 A1 | 1/2007 | Bujard et al. | |
| 2007/0032573 A1 | 2/2007 | Yanagase et al. | |
| 2007/0212487 A1 | 9/2007 | Anselmann et al. | |
| 2007/0299196 A1 | 12/2007 | Ohkoshi et al. | |
| 2008/0306021 A1 | 12/2008 | Buerger et al. | |
| 2010/0047300 A1 | 2/2010 | Kaupp et al. | |
| 2010/0083872 A1 | 4/2010 | Kitamura et al. | |
| 2010/0129412 A1 | 5/2010 | Kitamura | |
| 2010/0227181 A1 | 9/2010 | Kitamura | |
| 2010/0249304 A1 | 9/2010 | Kitamura et al. | |

FOREIGN PATENT DOCUMENTS

| | | |
|---|---|---|
| DE | 19739124 | 6/1998 |
| EP | 0 191 292 | 8/1986 |
| EP | 0 342 533 | 5/1989 |
| EP | 0 649 886 | 4/1995 |
| EP | 0 882 673 | 12/1998 |
| EP | 1 469 042 | 10/2004 |
| EP | 1 671 956 | 6/2006 |
| JP | 46-009555 | 3/1971 |
| JP | 48-032415 | 10/1973 |
| JP | 55-018469 | 5/1980 |
| JP | 60-092359 | 5/1985 |
| JP | 61-161212 | 7/1986 |
| JP | 1-138270 | 5/1989 |
| JP | 1-292067 | 11/1989 |
| JP | 1-313575 | 12/1989 |
| JP | 3-054126 | 3/1991 |
| JP | 3-066764 | 3/1991 |
| JP | 4-025582 | 1/1992 |
| JP | 4-193725 | 7/1992 |
| JP | 6-319996 | 11/1994 |
| JP | 7-018199 | 1/1995 |
| JP | 7-268241 | 10/1995 |
| JP | 08-199098 | 8/1996 |
| JP | 10-81837 | 3/1998 |
| JP | 10-114867 | 5/1998 |
| JP | 10-158572 | 6/1998 |
| JP | 10-508599 | 8/1998 |
| JP | 10-259317 | 9/1998 |
| JP | 10-292152 | 11/1998 |
| JP | 11-012426 | 1/1999 |
| JP | 11-130975 | 5/1999 |
| JP | 2000-505833 | 5/2000 |
| JP | 2000-169122 | 6/2000 |
| JP | 2001-031421 | 2/2001 |
| JP | 2001-072933 | 3/2001 |
| JP | 2001-089324 | 4/2001 |
| JP | 2001-226601 | 8/2001 |
| JP | 2001-234090 | 8/2001 |
| JP | 2002-20218 | 1/2002 |
| JP | 2002-509561 | 3/2002 |
| JP | 2002-114934 | 4/2002 |
| JP | 2002-155240 | 5/2002 |
| JP | 2002-194247 | 7/2002 |
| JP | 2002-200844 | 7/2002 |
| JP | 2003-012461 | 1/2003 |
| JP | 2003-213156 | 7/2003 |
| JP | 2004-512394 | 4/2004 |
| JP | 2004-262794 | 9/2004 |
| JP | 2004-275972 | 10/2004 |
| JP | 2004-533510 | 11/2004 |
| JP | 2005-187782 | 7/2005 |
| JP | 2006-176742 | 7/2006 |
| JP | 2006-192384 | 7/2006 |
| JP | 2006-241012 | 9/2006 |
| JP | 2006-257176 | 9/2006 |
| JP | 2006-282572 | 10/2006 |
| JP | 2006-328182 | 12/2006 |
| JP | 2007-051110 | 3/2007 |
| JP | 2007-063127 | 3/2007 |
| JP | 2007-077297 | 3/2007 |
| JP | 2007-138053 | 6/2007 |
| JP | 2007-217319 | 8/2007 |

(56) References Cited

FOREIGN PATENT DOCUMENTS

| | | |
|---|---|---|
| JP | 2007-217495 | 8/2007 |
| WO | 96/14278 | 5/1996 |
| WO | 99/62646 | 12/1999 |
| WO | 02/31058 | 4/2002 |
| WO | 02/090448 | 11/2002 |
| WO | 03/006558 | 1/2003 |
| WO | 2007/054379 | 5/2007 |

OTHER PUBLICATIONS

Kurata et al. "Saishin Funtai Bussei Zusetsu (Physical Properties of Powder Particles with Illustrations, Latest version), Third Edition," NGT Co., Jun. 30, 2004, p. 13, with its partial translation.

\* cited by examiner

BRIGHT PIGMENT, METHOD FOR PRODUCING THE PIGMENT, AND WATERBORNE RESIN COMPOSITION CONTAINING THE PIGMENT

TECHNICAL FIELD

The present invention relates to a bright pigment, a method for producing the pigment, and a waterborne resin composition containing the pigment.

BACKGROUND ART

Conventionally, as bright pigments, scaly aluminum particles, graphite chip particles, scaly glass particles, scaly glass particles covered with silver, natural mica chip particles covered with a metal oxide such as titanium dioxide or iron oxide, and the like are known.

These bright pigments have the property of glittering by reflecting light from the surfaces thereof, and are used as materials for paint, ink, a resin composition for molding, and cosmetics. These bright pigments provide a coating surface obtained by applying paint, a printing surface using ink, or the surface of a resin molding molded using a resin composition for molding with a peculiar outer appearance having a wide variety and being excellent in beauty, in combination with the color tone of a base material of the surface.

Furthermore, as the bright pigments having a metallic luster, the following are known.

(1) Powder obtained by crushing aluminum powder or a foil-shaped resin covered with metal.

(2) Natural mica powder covered with metal.

These bright pigments have a metallic luster, so that they can provide an object to be used with a strong brightness appearance and provide the target to be used with an excellent outer appearance in terms of design.

Therefore, the bright pigment is mixed with paint used for coating of automobiles, motorcycles, OA equipment, mobile telephones, and household electric appliances, ink of various printed matters or writing instruments, or cosmetics and used for wide applications.

As examples of the bright pigments, for example, METASHINE (Registered Trademark) PS series already have been put on the market by the applicant of the present application. This bright pigment has a structure in which a scaly glass base is covered with silver.

When a coating is formed of paint containing a bright pigment whose base is covered with metal, there arise the following problems in some cases.

Corrosive substances such as a sulfur compound and a chlorine compound may be present in an environment in which the above coating is placed. In this case, metal is discolored with the passage of time, and the bright pigment loses an original metallic luster, resulting in that the coating loses an original outer appearance. The reason for this is considered to be as follows: the sulfur compound, the chlorine compound, or the like permeates the inside of the coating, and a part of the compound chemically reacts with metal covering the base, thereby corroding the metal.

In order to solve the problem, a bright pigment has been disclosed in which flake-shaped glass is covered with a metal coating layer and a dense protective coating layer in this order (for example, see Patent Document 1). The dense protective coating layer is made of a metal oxide. The dense protective coating layer is formed by dispersing flake-shaped glass covered with a metal coating layer in a predetermined alkaline solution for a predetermined period of time, and taking the flake-shaped glass covered with the metal coating layer out of the alkaline solution and sintering it. The predetermined alkaline solution contains metal alkoxide, water, and alcohol.

Furthermore, Patent Documents 2-4 disclose a paint composition for protecting a silver coating formed by vapor deposition. The paint composition described in Patent Document 2 contains a silicone acrylic resin and a zirconium complex of carboxylic acid as a silver inactivating component. The paint composition described in Patent Document 3 contains a silicone alkyd resin and a zirconium complex of carboxylic acid as a silver inactivating component. The paint composition described in Patent Document 4 is made of at least one resin selected from the group consisting of a silicone acrylic resin, a silicone alkyd resin, and a particular polyfunctional silicone cross-linking resin having a siloxane bond as a main chain.

Patent Document 1: JP 4-193725 A
Patent Document 2: JP 10-158572 A
Patent Document 3: JP 10-292152 A
Patent Document 4: WO 99/62646

DISCLOSURE OF INVENTION

Problem to be Solved by the Invention

Recently, it is becoming preferred that paint or the like be aqueous for the protection of environment. However, in the case where a bright pigment in which an inorganic base is covered with a coating containing silver or a silver alloy is added to paint or the like, the coating is yellowed with the passage of time.

The present invention provides a bright pigment suitable as a material for paint or the like, in which the above-mentioned yellowing occurring with the passage of time is suppressed, a production method thereof, and a waterborne resin composition containing the bright pigment.

Means for Solving Problem

A bright pigment of the present invention includes a scaly inorganic base, a silver-containing coating that covers the inorganic base and contains silver or a silver alloy, and a yellowing-suppressing coating that covers the inorganic base from outside of the silver-containing coating and contains a metal compound functioning as an oxidizing agent.

A method for producing a bright pigment of the present invention includes the steps of covering a surface of a scaly inorganic base with a silver-containing coating containing silver or a silver alloy; and forming a yellowing-suppressing coating that covers the inorganic base from outside of the silver-containing coating and contains a metal compound functioning as an oxidizing agent.

A waterborne resin composition of the present invention contains the bright pigment of the present invention, a waterborne resin, and an alcohol-based solvent.

DESCRIPTION OF THE INVENTION

Figure 1:
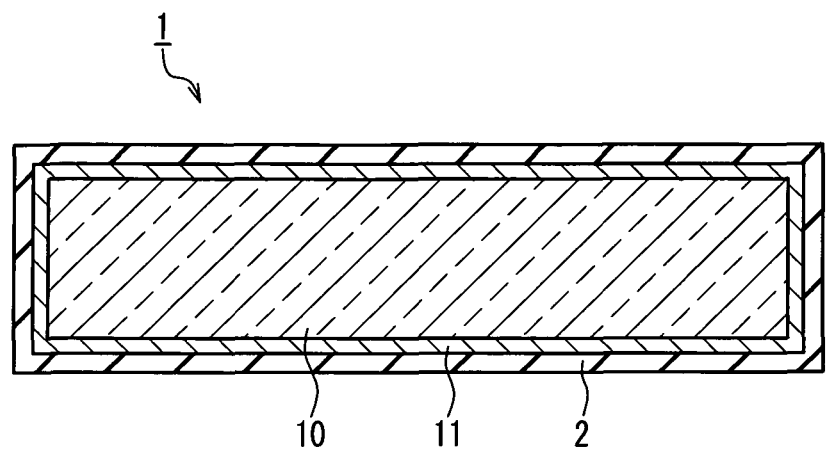
FIG. 1 is a schematic cross-sectional view showing an exemplary bright pigment of the present invention.

The inventors of the present invention studied the above-mentioned yellowing phenomenon in detail to find that there are the following two causes for the yellowing phenomenon.

(Cause 1)

The above-mentioned paint or the like contains an alcohol-based solvent so as to enhance the solubility and dispersibility of a waterborne resin. The alcohol-based solvent is oxidized by the oxidation catalyst function of silver to become aldehyde and ketone.

Silver is eluted as ions from a coating containing elemental silver or a silver alloy into the paint. If the paint contains a component that ionizes silver, such as ammonia or amine, silver is more likely to be eluted as ions.

When the silver ions are reduced by aldehyde and ketone, a silver colloid is generated. It was clarified that the paint is yellowed due to the presence of the silver colloid.

The inventors of the present invention found that the above-mentioned problem of yellowing can be solved by suppressing the generation of the silver colloid.

Next, the generation mechanism of a silver colloid will be described in detail.

For example, in the case where ammonia is present in paint, silver reacts as represented by the following Chemical Formula (Chemical Formula 1) to generate silver ions.

$$Ag + 2NH_4OH \rightarrow [Ag(NH_3)_2]^+ + 2H_2O \rightarrow Ag^+ + 2NH_4OH \quad \text{(Chemical Formula 1)}$$

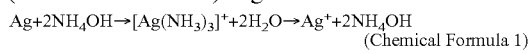

For example, when ethyl alcohol which is one of the primary alcohols, is oxidized by the oxidation catalyst function of silver, aldehyde is generated. Furthermore, the silver ions are reduced by aldehyde, whereby a silver colloid is generated as represented by the following Chemical Formula (Chemical Formula 2).

$$2Ag^+ + 2C_2H_5OH + O_2 \rightarrow 2Ag\downarrow + 2CH_3CHO + 2H_2O \quad \text{(Chemical Formula 2)}$$

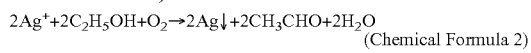

For example, when isopropyl alcohol is oxidized by the oxidation catalyst function of silver, ketone is generated. Furthermore, the silver ions are reduced by ketone, whereby a silver colloid is generated as represented by the following Chemical Formula (Chemical Formula 3).

$$2Ag^+ + 2(CH_3)_2CHOH + O_2 \rightarrow 2Ag\downarrow + (CH_3)_2CO + 2H_2O \quad \text{(Chemical Formula 3)}$$

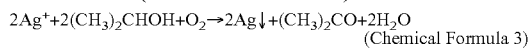

It is considered that the silver colloid is generated through such a mechanism. Then, the inventors of the present invention found that the reduction function of aldehyde and ketone is suppressed by forming a coating with an oxidation ability on a coating containing elemental silver or a silver alloy, whereby the generation of a silver colloid is suppressed.

(Cause 2)

Furthermore, the waterborne resin itself may be oxidized to be yellowed by the oxidation catalyst function of silver. An example of such a resin includes a styrene copolymer containing a styrene monomer as a material. Examples of the styrene copolymer include a styrene-(meth)acrylic copolymer, a styrene-butadiene copolymer (for example, a styrene-butadine based latex with a carboxyl group introduced thereto), and a styrene-maleic anhydride copolymer.

It is known that the oxidation catalyst function of silver causes the partial oxidation of ethylene (for example, see JP 6-319996 A). The inventors of the present invention found that the yellowing caused by the above-mentioned partial oxidation can be suppressed by covering a silver-containing coating containing silver or a silver alloy with a coating containing a metal compound that functions as an oxidizing agent.

Embodiment 1

In Embodiment 1, an exemplary bright pigment of the present invention and a production method thereof will be described.

As shown in FIG. 1, an exemplary bright pigment 1 of the present invention has a configuration in which a scaly inorganic base 10 is covered with a silver-containing coating 11 containing silver or a silver alloy and a yellowing-suppressing coating 2 containing a metal compound that functions as a oxidizing agent in this order.

(Scaly Inorganic Base)

As the material for the scaly inorganic base 10, for example, there is at least one selected from the group consisting of glass, natural mica, synthetic mica, silica, and alumina. Among them, glass is preferred since it is easy to obtain a smooth surface.

The shape of the scaly inorganic base 10 varies depending upon the use, and is not particularly limited. Generally, it is preferred that an average particle size is 1 μm to 500 μm, and an average thickness is 0.3 μm to 10 μm. If the average particle size is too large, the scaly inorganic base 10 may be crushed when the bright pigment is mixed with paint or the like. On the other hand, if the average particle size is too small, a principal plane of the bright pigment (particles) is directed randomly in a coating, and reflected light emitted by each particle becomes weak. Therefore, the glittering appearance may be lost. If the average particle size is 1 μm to 500 μm, the bright pigment is suppressed from being crushed in the course of mixing, and a glittering appearance can be enhanced.

In the case where the exemplary bright pigment of the present invention is used, for example, for cosmetics, although the average particle size of the scaly inorganic base 10 may be selected appropriately depending upon the kind of cosmetics and the like, the average particle size generally is preferably 20 μm to 500 μm, and more preferably 20 μm to 250 μm. If the average particle size is 20 μm to 500 μm, each particle glitters more strongly, whereby cosmetics with a more glittering particle feeling can be realized.

The average thickness of the inorganic base 10 is preferably 0.5 μm to 7 μm, and more preferably 0.5 to 3 μm. The average thickness of 0.5 μm to 7 μm is preferred, since the spreadability and the feeling of use of the cosmetics containing the bright pigment of the present invention on the surface of keratin composing the stratum corneum of skin, nail, lip, and the like are improved.

In the case where the exemplary bright pigment of the present invention is used, for example, for ink, the average particle size of the scaly inorganic base 10 is preferably 1 μm to 40 μm, and more preferably 15 to 35 μm. For example, in the case where ink is printed by a method such as gravure printing, if the average particle size of the bright pigment is 1 μm to 40 μm, problems in printability such as plate fogging can be prevented. Plate fogging refers to a phenomenon in which a doctor blade cannot sufficiently scrape ink off a plate during printing, and the ink is transferred to an object to be printed to cause scumming of printed matter.

It is preferred that the average thickness of the scaly inorganic base 10 is 0.3 μm to 3 μm. When the average thickness is 0.3 μm to 3 μm, the surface finish of printing is improved.

Although a method for producing a scaly glass base that is an example of the scaly inorganic base 10 is not particularly limited, for example, a blow method is preferred. According to the blow method, first, material cullet is melted. The melted glass is discharged from a circular slit continuously, and simultaneously, gas such as air is blown in from a blow nozzle provided inside the circular slit. Thus, the melted glass is pulled while being expanded to have a balloon shape. When the balloon-shaped glass is crushed, a scaly glass base is obtained.

The scaly glass base produced by the above blow method has a smooth surface, so that the base reflects light well. It is preferred to mix an exemplary bright pigment using the scaly glass base with a waterborne resin composition or the like, since a coating surface or the like having a high brightness appearance is obtained.

(Silver-Containing Coating)

The silver-containing coating 11 contains elemental silver or a silver-based alloy. In the case where the silver-containing coating 11 contains elemental silver, the silver-containing coating 11 may be formed substantially of silver.

Assuming that the total mass of the bright pigment of the present invention is 100% by weight, the bright pigment contains silver (including silver in a silver-based alloy) in an amount of preferably 10% by weight or more, more preferably 15% by weight or more, and much more preferably 20 to 25% by weight or more in terms of ensuring a glittering appearance.

Examples of the silver alloy include a silver-gold alloy, a silver-palladium alloy, a silver-platinum alloy, a silver-gold-palladium alloy, a silver-platinum-palladium alloy, or a silver-gold-platinum alloy. The silver alloy has water resistance and corrosion resistance higher than those of elemental silver. Therefore, when the silver-containing coating 11 contains a silver alloy, the water resistance and the corrosion resistance of a coating or the like formed using ink, paint, or the like containing the bright pigment of the present invention are enhanced.

A method for covering the inorganic base 10 with the silver-containing coating 11 is not particularly limited, and a known method for forming a coating can be used.

For example, examples of commercially available products of a scaly glass base covered with elemental silver include METASHINE (Registered Trademark) PS series: MC2080PS, MC5480PS, MC5230PS, MC5150PS, MC5090PS, MC5030PS, ME2040PS, and ME2025PS.

(Yellowing-Suppressing Coating Containing a Metal Compound that Functions as an Oxidizing Agent)

Examples of the metal compound that functions as an oxidizing agent include at least one selected from the group consisting of a hydroxide of metal, an oxide hydrate of metal, and a salt of an oxide hydrate of metal, and examples of the above-mentioned metal include at least one selected from the group consisting of tungsten, molybdenum, bismuth, vanadium, and cerium. Thus, examples of the above-mentioned metal compound that functions as an oxidizing agent include a hydroxide of cerium, an oxide hydrate of cerium, a salt of an oxide hydrate of cerium, a hydroxide of tungsten, an oxide hydrate of tungsten, a salt of an oxide hydrate of tungsten, a hydroxide of vanadium, an oxide hydrate of vanadium, a salt of an oxide hydrate of vanadium, a hydroxide of bismuth, an oxide hydrate of bismuth, a salt of an oxide hydrate of bismuth, a hydroxide of molybdenum, an oxide hydrate of molybdenum, and a salt of an oxide hydrate of molybdenum.

The oxide hydrate of metal also is called a metal acid. For example, in the case where the above-mentioned metal is tungsten, an oxide hydrate of tungsten ($WO_4.nH_2O$) also is called tungstic acid ($H_2WO_4$). Then, a metal salt of an oxide hydrate of tungsten ($xMO.yWO_3.zH_2O$) also is called a tungstate ($MWO_4$). The above-mentioned M is at least one selected from the group consisting of Na, Ca, and Zr, and "x" and "y" satisfy a relational expression: $x=y=1$ (including $z=0$).

More specific examples of the metal compound that functions as an oxidizing agent include the following compounds.

Examples of an acid of cerium or a salt of cerium which is a material for a hydroxide of cerium, an oxide hydrate of cerium, and a salt of an oxide hydrate of cerium, include cerium(IV) diammonium nitrate ($Ce(NH_4)_2(NO_3)_6$), cerium(IV) tetraammonium sulfate ($Ce(NH_4)_4(SO_4)_4.2H_2O$), cerium(III) nitrate ($Ce(NO_3)_3.6H_2O$), cerium(III) chloride ($CeCl_3.7H_2O$), cerium(III) ammonium nitrate ($Ce(NH_4)_2(NO_3)_5.4H_2O$), and cerium(III) acetate (($CH_3COO)_3Ce.H_2O$)).

Examples of an acid of tungsten or a salt of tungsten, which is a material for a hydroxide of tungsten, an oxide hydrate of tungsten, and a salt of an oxide hydrate of tungsten, include tungstic(VI) acid ($H_2WO_4$), sodium tungstate(VI) ($Na_2WO_4.2H_2O$), tungsten(VI) trioxide ($WO_3$), ammonium paratungstate ($5(NH_4)_2O.12WO_3.5H_2O$), ammonium metatungstate ($NH_4[H_2W_{12}O_{40}].nH_2O$), potassium tungstate(VI) ($K_2WO_4$), and calcium tungstate(VI) ($CaWO_4$).

Examples of an acid of molybdenum or a salt of molybdenum, which is a material for a hydroxide of molybdenum, an oxide hydrate of molybdenum, and a salt of an oxide hydrate of molybdenum, include sodium molybdate(VI) ($Na_2MoO_4.2H_2O$), ammonium molybdate(VI) (($NH_4)_6Mo_7O_{24}.4H_2O$), molybdenum pentachloride ($MoCl_5$), molybdenum(VI) trioxide ($MoO_3$), and zinc molybdate(VI) ($ZnMoO_4$).

Examples of an acid of vanadium or a salt of vanadium, which is a material for a hydroxide of vanadium, an oxide hydrate of vanadium, and a salt of an oxide hydrate of vanadium, include sodium vanadate(V) ($NaVO_3$), potassium vanadate(V) ($KVO_3$), ammonium vanadate(V) ($NH_4VO_3$), vanadium pentoxide, vanadium(III) trichloride ($VCl_3$), and bis(maltolato)oxovanadium(IV) ($C_{12}H_{10}O_7V$).

Examples of an acid of bismuth or a salt of bismuth, which is a material for a hydroxide of bismuth, an oxide hydrate of bismuth, and a salt of an oxide hydrate of bismuth, include bismuth(III) oxychloride (BiOCl), basic bismuth(III) nitrate ($4BiNH_3(OH)_2.BiO(OH)$), sodium bismuthate(IV) ($BiNaO_3$), and bismuth(III) trioxide ($Bi_2O_3$).

The above-mentioned yellowing-suppressing coating 2 can be formed by mixing an aqueous solution containing the above-mentioned metal compound with the inorganic scaly base 10 covered with the silver-containing coating 11, and washing the inorganic base 10 covered with the silver-containing coating 11 filtered from the above-mentioned aqueous solution with water, followed by drying. Although the pH of the aqueous solution may be adjusted appropriately, 3 to 10 generally are appropriate. Drying may be performed, for example, using a constant-temperature drier. The appropriate temperature of an atmosphere in which drying is performed is 80° C. to 150° C.

The thickness of the yellowing-suppressing coating 2 is preferably 1 nm or more, and more preferably 5 nm or more, since the function as an oxidizing agent of the metal compound is exhibited effectively. Furthermore, the thickness of the yellowing-suppressing coating 2 is preferably 200 nm or less, and more preferably 100 nm or less in terms of ensuring sufficient brightness.

It is preferred that the yellowing-suppressing coating 2 further contains a phosphoric acid compound. It is preferred that the yellowing-suppressing coating contains a phosphoric acid compound because the insoluble phosphoric acid compound suppresses the elution of a metal compound that functions as an oxidizing agent.

As the phosphoric acid compound, an insoluble phosphate is preferred. Specifically, an orthophosphate, a pyrophosphate, a polyphosphate, a metaphosphate, or the like is preferred.

The yellowing-suppressing coating 2 containing a phosphoric acid compound can be formed by mixing an aqueous solution containing the above-mentioned metal compound and a phosphoric acid compound with the inorganic scaly base 10 covered with the silver-containing coating 11, and washing the inorganic base 10 covered with the silver-containing coating 11 filtered from the above-mentioned aqueous solution with water, followed by drying. Although the pH of the aqueous solution may be adjusted appropriately, 3 to 10 generally are appropriate. Drying may be performed, for example, using a constant-temperature drier. The appropriate temperature of an atmosphere in which drying is performed is 80° C. to 150° C.

The bright pigment of the present invention further may include a coating containing a phosphoric acid compound (not shown) covering the inorganic base 10 from outside of the yellowing-suppressing coating 2. As the phosphoric acid compound, an insoluble phosphate is preferred. Specifically, an orthophosphate, a pyrophosphate, a polyphosphate, a metaphosphate, or the like is preferred.

The thickness of the coating containing a phosphoric acid compound is preferably 1 to 20 nm. When the thickness of the coating containing a phosphoric acid compound is 1 to 20 nm, sufficient brilliance can be ensured, and the effect of suppressing the elution of a metal compound that functions as an oxidizing agent is exhibited sufficiently.

The coating containing a phosphoric acid compound can be formed by mixing an aqueous solution in which phosphoric acid ions and metal ions coexist with the inorganic base 10 covered with the silver-containing coating 11 and the yellowing-suppressing coating 2 in this order, and washing the inorganic base 10 covered with the silver-containing coating 11 filtered from the above-mentioned aqueous solution or the like with water, followed by drying. Although the pH of the aqueous solution may be adjusted appropriately, 3 to 10 generally is appropriate. Drying may be performed, for example, using a constant-temperature drier. The appropriate temperature of an atmosphere in which drying is performed is 80° C. to 150° C.

Examples of the metal ions include ions of alkali metal such as sodium and potassium, ions of alkaline-earth metal such as calcium and magnesium, and ions of metal such as nickel, iron, zinc, tin, titanium, and zirconium.

(Protective Film)

Figure 2:
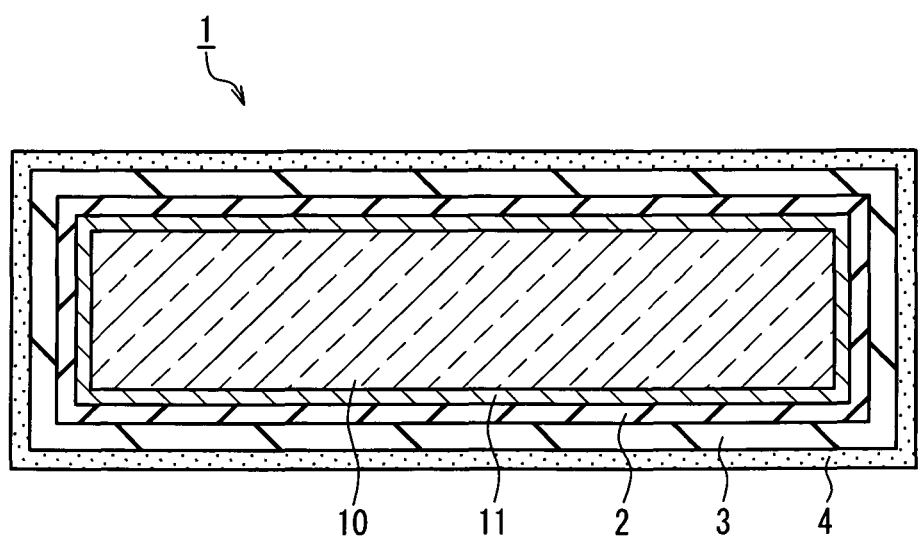
FIG. 2 is a schematic cross-sectional view showing another exemplary bright pigment of the present invention.

As shown in FIG. 2, the bright pigment of the present invention further may include a protective coating 3 covering the inorganic base 10 from outside of the yellowing-suppressing coating 2. As the protective coating 3, for example, there is a silica-based coating containing $SiO_2$ as a main component. Although the protective coating 3 may be formed of substantially only silica, the protective coating 3 may contain, as components other than silica, at least one of titanium and zirconium so as to adjust the refractive index of a coating and improve alkali resistance. The protective coating 3 may be an outermost layer of a bright pigment.

It is preferred that the thickness of the protective coating 3 is 10 nm to 200 nm. When the thickness is 10 nm to 200 nm, the high protective function by the protective coating 3 and high brightness are exhibited, and the peeling of the protective coating 3 that may occur because of too large thickness and the increase in cost can be suppressed.

As a method for forming the protective coating 3, there is a method for allowing silica to be deposited. Specifically, a so-called sol-gel method for allowing silica to be deposited by hydrolyzing an organic metal compound is preferred.

(Coupling Treatment Layer)

In the bright pigment of the present invention, in order to enhance the compatibility with respect to a resin such as a thermosetting resin, a coupling treatment layer 4 may be formed as an outermost layer, if required. The coupling treatment layer 4 contains an organic compound having a functional group. Examples of the functional group include at least one selected from a methacryloxy group, an epoxy group, an amino group, an alkoxyl group, a vinyl group, and an isocyanate group. The coupling treatment layer 4 can be formed by mixing an aqueous solution containing an organic compound having a functional group with an object to be treated, and drying the object filtered from the above-mentioned aqueous solution. Although the pH of the aqueous solution may be adjusted appropriately, 3 to 10 generally are appropriate. Drying may be performed, for example, using a constant-temperature drier. The appropriate temperature of an atmosphere in which drying is performed is 80° C. to 150° C. Specific examples of the organic compound include the following.

As the above-mentioned organic compound, a coupling agent is preferred in terms of enhancing the cohesion with respect to the resin in a waterborne resin composition. Examples of the coupling agent include at least one selected from the group consisting of an organic silane coupling agent, an organic titanium-based coupling agent, a zirconia-based coupling agent, an aluminum-based coupling agent, and a zirconium and aluminum based coupling agent. The organic silane coupling agent is more preferred for the reason of high cohesion with respect to a thermosetting resin. In the case where the high dispersibility of the bright pigment is required, an organic titanium coupling agent, an organic zirconium-based coupling agent, an organic aluminum-based coupling agent, or an organic zirconium and aluminum based coupling agent may be used in place of the organic silane coupling agent.

Examples of the organic silane coupling agent having a methacryloxy group include 3-methacryloxypropylmethyldimethoxysilane, 3-methacryloxypropyltrimethoxysilane, 3-methacryloxypropylmethyldiethoxysilane, and 3-methacryloxypropyltriethoxysilane.

Examples of the organic silane coupling agent having an epoxy group include 3-glycidoxypropyltrimethoxysilane, 3-glycidoxypropylmethyldiethoxysilane, 3-glycidoxypropyltriethoxysilane, and 2-(3,4 epoxycyclohexyl)ethyltrimethoxysilane.

Examples of the organic silane coupling agent having an amino group include 3-aminopropyltrimethoxysilane, 3-aminopropyltriethoxysilane, N-2(aminoethyl)3-aminopropyltrimethoxysilane, N-2(aminoethyl)3-aminopropyltriethoxysilane, N-2(aminoethyl) 3-aminopropylmethyldimethoxysilane, N-2(aminoethyl)3-aminopropyltrimethoxysilane, and N-2(aminoethyl)3-aminopropyltriethoxysilane.

Examples of the organic silane coupling agent having an alkoxyl group include tetraalkoxysilane such as tetramethylsilane, tetraethoxysilane, tetrapropoxysilane, and tetrabutoxysilane.

Examples of the organic silane coupling agent having a vinyl group include vinyl trichlorosilane, vinyl trimethoxysilane, and vinyl triethoxysilane.

Examples of the organic silane coupling agent having an isocyanate group include 2-isocyanatoethyl trimethoxysilane, 2-isocyanatoethyl triethoxysilane, 3-isocyanapropyl trimethoxysilane, and 3-isocyanatopropyl triethoxysilane.

The amount of the coupling agent is preferably 0.01 to 5.0% by weight based on the total mass of the aqueous composition. When the mixed ratio of the coupling agent is 0.01 to 5.0% by weight, the sufficient compatibility of the bright pigment with respect to a waterborne resin contained in the aqueous composition is obtained.

Embodiment 2

In Embodiment 2, an exemplary waterborne resin composition of the present invention and a production method thereof will be described.

An exemplary waterborne resin composition of the present invention contains the bright pigment of the present invention, a waterborne resin, and an alcohol-based solvent. Specific examples of the waterborne resin composition include a coating agent such as paint, ink, cosmetics, or a film coating agent. The waterborne resin composition of the present invention is a solution or a dispersion (emulsion) containing an alcohol-based solvent as a solvent.

Examples of the waterborne resin include a resin having a carboxyl group, and the like.

Specific examples of the resin having a carboxyl group include a synthetic resin such as an acrylic acid based polymer containing a carboxyl group (for example, an acrylic resin (homopolymer), a (meth)acrylic copolymer, an ethylene-(meth)acrylic acid copolymer, a vinyl acetate-(meth)acrylic acid copolymer, a (meth)acrylic ester-(meth)acrylic acid copolymer, a styrene-(meth)acrylic acid copolymer, etc.), a styrene-butadiene copolymer (for example, styrene-butadine based latex with a carboxyl group introduced thereto), a styrene-maleic anhydride copolymer, a urethane resin containing a carboxyl group, a polyester resin containing a carboxyl group, an alkyd resin containing a carboxyl group, and polyvinyl alcohol based resin containing a carboxyl group; and a natural resin such as carboxymethyl cellulose. Two-component based resins such as acrylic modified polyester, acrylic modified polyurethane, and acrylic modified epoxy resin also can be used.

Hereinafter, more detailed description will be made, exemplifying an acrylic acid based polymer containing a carboxyl group and an acrylic modified epoxy resin.

(Acrylic Acid Based Polymer Containing a Carboxyl Group)

The acrylic acid based polymer containing a carboxyl group is obtained, for example, by copolymerizing acrylic esters with aromatic vinyls, or vinyl esters. The acrylic acid based polymer containing a carboxyl group contains, for example, a constituent unit derived from a monomer (a carboxyl group or a salt thereof) in an amount of preferably 0.2 to 30% by weight, and more preferably 1 to 20% by weight. The acid value of the acrylic acid based polymer containing a carboxyl group is preferably 2 to 200 mg·KOH/g, and more preferably 10 to 100 mg·KOH/g.

The weight-average molecular weight of the acrylic acid based polymer containing a carboxyl group is, for example, preferably 1000 to 1000000, more preferably 3000 to 500000, and much more preferably 5000 to 100000. Furthermore, the glass transition temperature of the acrylic acid based polymer containing a carboxyl group generally is preferably $-60°$ C. to $50°$ C., although it varies depending upon the use of the waterborne resin composition.

Specifically, in the case where the waterborne resin composition is paint, a coating agent, or ink for printing, it is preferred that the waterborne resin composition contains an acrylic acid based polymer containing a carboxyl group having a glass transition temperature of $-10°$ C. to $50°$ C. In the case where the waterborne resin composition is an adhesive, it is preferred that the waterborne resin composition contains an acrylic acid based polymer containing a carboxyl group having a glass transition temperature of $-20°$ C. to $30°$ C.

(Acrylic Modified Epoxy Resin)

The acrylic modified epoxy resin has a configuration in which an acrylic vinyl copolymer is introduced into an epoxy resin of a main chain, and a carboxyl group is bonded to the vinyl copolymer.

The acrylic modified epoxy resin containing a carboxyl group can be obtained by subjecting the above-mentioned vinyl copolymer and epoxy resin to esterification in the presence of a basic compound in a hydrophilic organic solvent.

There is no particular limit to the ethylenically unsaturated carbonic acid monomer that is a material for the above-mentioned vinyl copolymer, and examples of the ethylenically unsaturated carbonic acid include acrylic acid, methacrylic acid, maleic acid, fumaric acid, and itaconic acid. These monomers may be used in a combination of at least two kinds. There is no particular limit to a method for polymerizing the monomer components, and for example, the monomer components may be polymerized using an ordinary radical polymerization initiator such as azobisisobutylonitrile and benzoyl peroxide.

As the epoxy resin, at least one selected from the group consisting of a bisphenol F type epoxy resin, a bisphenol A type epoxy resin, and a hydrogenated bisphenol A type epoxy resin is preferred, and the resin having 1.1 to 2.0 epoxy groups on average per molecule and a number-average molecular weight of 900 or more is preferred.

It is preferred that the weight average molecular weight of the acrylic modified epoxy resin is, for example, 2000 to 100000. If the weight average molecular weight is 2000 to 100000, emulsification dispersibility is improved, and gelling is unlikely to occur during the reaction between the acrylic vinyl copolymer and the epoxy resin.

The waterborne resin composition can be prepared, for example, by dissolving a waterborne resin in an alcohol-based solvent together with alkali.

Examples of the alcohol-based solvent include methanol, ethanol, propanol, isopropanol, and n-butanol.

The waterborne resin composition further may contain water or a hydrophilic organic solvent as a solvent other than the alcohol-based solvent. Examples of the hydrophilic organic solvent include esters (for example, ethyl acetate, n-butyl acetate, isobutyl acetate, n-butyl acetate, etc.), ketones (for example, acetone, methyl ethyl ketone, methyl isobutyl ketone, etc.), cellosolves (for example, methyl cellosolve (ethylene glycol monomethyl ether), ethyl cellosolve, propyl cellosolve, butyl cellosolve, phenyl cellosolve, benzyl cellosolve, etc.), and carbitols (for example, diethylene glycol monomethyl ether, carbitol (diethylene glycol monoethyl ether), diethylene glycol monopropyl ether, etc.). They may be used in a combination of at least two kinds.

Examples of the alkali include organic bases such as aliphatic amine (for example, trimethylamine, triethylamine, ethylenediamine, etc.); alkanolamine such as ethanolamine, diethanolamine, dimethylethanolamine, and triethanolamine; heterocyclic amine such as morpholine; ammonia, and inorganic bases such as an alkali metal compound (sodium hydroxide, potassium hydroxide, etc.). Among them, ammonia, diethanolamine, dimethylethanolamine, and triethanolamine are preferred.

It is desired that acidic groups (for example, carboxyl groups) contained in a waterborne resin are neutralized with a base to such as degree that the waterborne resin (for example, an acrylic acid based polymer containing a carboxyl group) can be dispersed in water. It is preferred that the ratio of acidic groups to be neutralized among all the acidic groups is about 50%. For example, assuming that the total number of moles of acidic groups contained in the waterborne resin is 1, it is preferred to neutralize the acidic groups, using amine with the number of moles that is 0.4 to 2.0 times, preferably 0.6 to 1.4 times the total number of moles.

An aqueous emulsion can be prepared by a common method, for example, a method for dispersing an acrylic acid based polymer containing a carboxyl group by neutralizing a part of carboxyl groups of the acrylic acid based polymer containing a carboxyl group with a base, a common emulsion polymerization method, or the like. For emulsion polymerization, a common emulsifier (for example, protective colloid agents such as an anionic surfactant, a nonionic surfactant, polyvinyl alcohol, or a water-soluble polymer) may be used. The pH of the aqueous emulsion may be adjusted using a pH adjusting agent.

The concentration (concentration of a solid content) of the waterborne resin in the waterborne resin composition is not particularly limited, and for example, preferably 10 to 70% by weight, and more preferably 25 to 50% by weight.

(Cross-Linking Curing Agent)

In the case where the waterborne composition of the present invention is paint, a coating agent, or the like, the waterborne composition further may contain a cross-linking curing agent. Examples of the cross-linking curing agent include at least one selected from the group consisting of an amino resin and a polyisocyanate compound. In the case where the waterborne resin contained in paint or a coating agent has at least one functional group selected from the group consisting of a hydroxyl group, a carboxyl group having active hydrogen, and an amino group, these functional groups react with the above-mentioned cross-linking agent, whereby the waterborne resin is cured.

Examples of the above-mentioned amino resin (cross-linking agent) include a melamine resin such as an alkyl-etherified melamine resin, a benzoguanamine resin such as an alkyl-etherified benzoguanamine resin, and a urea resin such as an alkyl-etherified urea resin. Among them, the melamine resin is preferred. Specific examples of the melamine resin include dimethylolmelamine, trimethylolmelamine, tetramethylolmelamine, pentamethylolmelamine, and hexamethylolmelamine. Furthermore, the amino resin may be alkyl-etherified products of these melamine resins (methyl ether, ethyl ether, propyl ether, isopropyl ether, butyl ether, isobutyl ether, etc.), a urea-formaldehyde condensate, or a urea-melamine condensate. These amino resins may be used in a combination of at least two kinds.

Regarding the content of the amino resin, for example, the mass ratio between the waterborne resin (solid content) and the amino resin (solid content) is set to be preferably 95/5 to 60/40, and more preferably 85/15 to 65/35. If the above-mentioned mass ratio is 95/5 to 60/40, high strength and high corrosion resistance are obtained in a coating formed by applying paint and a coating layer obtained by coating of a coating agent.

As the polyisocyanate compound, for example, a block polyisocyanate compound with a structure, in which an isocyanate group of polyisocyanate is masked with a blocking agent, is preferred. Examples of the polyisocyanate include an HDI type (hexamethylene diisocyanate, etc.), a TDI type (tolylene diisocyanate, etc.), an XDI type (xylylene diisocyanate, etc.), and an MDI type (diphenylmethane diisocyanate, etc.). Examples of the blocking agent include oxime and lactam.

Regarding the content of the above-mentioned polyisocyanate compound, for example, in the case where the polyisocyanate compound is a block polyisocyanate compound, it is preferred that the molar ratio (number of moles of hydroxyl groups/number of moles of reproduced isocyanate groups) between the hydroxyl groups of the waterborne resin and the reproduced deblocked isocyanate groups of the polyisocyanate compound is set to be 100/20 to 100/150.

In the case where the waterborne resin composition of the present invention is paint, a coating agent, an adhesive, or the like, they are applied to an adherend or the like, and dried by heating, if required, whereby a coating, a coating layer, or an adhesive layer is obtained. Although there is no particular limit to an application method or a coating method, common methods such as spray coating, roll coating, knife coating, bar coarter coating, dip coating, and coating using a brush can be used. Although the thickness of a coating or a coating layer varies depending upon the kind of an adherend, for example, it is preferably 0.1 µm to 1000 µm, more preferably 0.2 µm to 500 µm, and much more preferably 0.3 µm to 300 µm. Although the thickness of the adhesive layer varies depending upon the kind of the adherend, for example, it is preferably 1 µm to 10000 µm, more preferably 5 µm to 5000 µm, and much more preferably 10 µm to 3000 µm.

The temperature of an atmosphere in which paint, a coating agent, or an adhesive is dried or cured is, for example, preferably 10° C. to 200° C., more preferably 20° C. to 150° C., and much more preferably 50° C. to 120° C.

The waterborne resin composition can be prepared by a common method, for example, using a mixing disperser. In the course of preparation using the mixing disperser, a dispersant may be added, if required.

The content of a bright pigment in the waterborne resin composition is preferably 0.1 to 120 parts by mass, more preferably 0.5 to 100 parts by mass, and much more preferably 1 to 50 parts by mass with respect to 100 parts by mass of the waterborne resin in terms of the conversion of a solid content.

The content of the bright pigment in the waterborne resin composition is adjusted to be preferably 0.1% by weight to 30% by weight and more preferably 1% by weight to 20% by weight after curing by heating. If the content of the bright pigment is 0.1% by weight to 30% by weight, sufficient brightness can be ensured without impairing the color tone of a base material.

Depending upon the use, the waterborne resin composition of the present invention may contain, as resins other than the waterborne resin additives such as a thermoplastic resin (for example, an acrylic resin and a polyester resin not containing a carboxyl group, etc.), a thermosetting resin (for example, a urethane resin, an amino resin, etc.), an antioxidant, a UV-absorber, a stabilizer such as a heat stabilizer, a plasticizer, an antistatic agent, a dispersant, an antiskinning agent, a viscosity modifier such as a thickener, a flattening agent, an antisagging agent, an antifungal agent, a preservative, a filler, and a dye pigment.

EXAMPLES

Hereinafter, the present invention will be described in more detail by exemplifying examples and comparative examples.

The average particle size of a scaly glass base was measured using a laser diffraction type granulometer.

The average thickness of the scaly glass base used as a scaly inorganic base was obtained by measuring the thicknesses of 100 grains of the scaly glass base and averaging them. The thickness of each scaly glass base was obtained by measuring an optical path difference between direct light (light not influenced by a phase object) and light transmitted through a scaly glass base, using an interference microscope.

The thickness of each coating was measured using a secondary ion-microprobe mass spectrometer (SIMS) (IMS-6F, manufactured by Cameca Co. Ltd.). Specifically, the thickness of each coating was determined based on a component distribution from the surface of a bright pigment to the surface of a scaly glass base.

Example 1

A bright pigment of Example 1 has a configuration in which a scaly glass base is covered with a silver-containing coating, a yellowing-suppressing coating, a protective coating, and a coupling treatment layer in this order as in the example shown in FIG. 2. The silver-containing coating is made of silver. The bright pigment of Example 1 was produced as follows.

(Scaly Glass Base Covered with a Silver Coating)

First, as scaly glass with a silver coating formed thereon, MC2025PS manufactured by Nippon Sheet Glass Co., Ltd. was prepared. MC2025PS has a configuration in which a silver coating with a thickness of 20 nm to 60 nm is formed on a scaly glass base (average particle size: 25 μm, average thickness: 1.3 μm) by electroless plating.

(Yellowing-Suppressing coating)

A yellowing-suppressing coating containing at least one selected from the group consisting of a hydroxide of tungsten, an oxide hydrate of tungsten, and a metal salt of an oxide hydrate of tungsten, which function as an oxidizing agent, and a phosphoric acid compound was formed as follows.

First, 1000 mL of pure water was heated to 70° C., and 100 g of the above-mentioned ME2025PS was added to the pure water with stirring. Then, the pH of the pure water with ME2025PS added thereto was adjusted to 6, using dilute nitric acid. A tungstic acid solution obtained by dissolving 3.6 g of sodium tugstate(VI).dihydrate ($Na_2WO_4.2H_2O$) in 60 mL of pure water was dropped into the adjustment solution thus obtained at a speed of 6 mL/min. Furthermore, 120 mL of 0.1 N phosphoric acid solution was dropped onto the adjustment solution at a speed of 12 mL/min. simultaneously with the dropping of the tungstic acid solution.

While the pH of the adjustment solution was maintained to be 6, the adjustment solution was stirred for 20 minutes. Then, the scaly glass base obtained by filtration was washed with water, and thereafter, dried at 120° C. Thus, a coating containing at least one selected from the group consisting of a hydroxide of tungsten, an oxide hydrate of tungsten, and a metal salt of an oxide hydrate of tungsten, and a phosphoric acid compound was formed on the scaly glass base covered with a silver coating. The thickness of the coating was 10 nm.

(Protective Film)

First, 45 mL of tetraethoxysilane, 1500 ml of isopropyl alcohol, and 180 mL of pure water were mixed to obtain a solution for forming a protective coating. To the solution for forming a protective coating, 100 g of a scaly glass base covered with a silver coating and a yellowing-suppressing coating was added, and they were mixed with stirring by a stirrer. After that, 42 mL of a ammonium hydroxide solution (concentration: 25%) was added to the solution for forming a protective coating, and they were mixed with stirring for 2 to 3 hours, whereby a dehydration condensation reaction was effected. Accordingly, silica was deposited uniformly on the yellowing-suppressing coating to form a protective coating made of silica. Then, the scaly glass covered with a protective coating or the like was filtered to be taken out of the solution. The scaly glass was washed with water several times and dried at 180° C., and finally sintered at 550° C. for 2 hours. The thickness of the protective coating was 100 nm.

(Coupling Treatment Layer)

Then, as described below, a coupling treatment layer was formed using organic silane. Acetic acid was added to 1000 mL of pure water to adjust the pH to 3.5, and thereafter, 3 g of 3-methacryloxypropyltriethoxysilane was added to the mixture, followed by stirring for 15 minutes. A scaly glass base covered with a silver coating, a yellowing-suppressing coating, and a protective coating was added to the obtained adjustment solution, and the mixture was stirred for 30 minutes. Then, the scaly glass covered with a protective coating or the like was filtered to be taken out of the adjustment solution, and dried at 120° C., whereby the bright pigment of Example 1 in which the coupling treatment layer was formed on the protective coating was obtained. The coupling treatment layer is considered to be a monomolecular layer in which organic silane adsorbs to the surface of the protective coating.

Example 2

A bright pigment of Example 2 has a configuration similar to that of the bright pigment of Example 1, except that a silica protective coating is not provided, and a production method thereof also is the same as that of the bright pigment of Example 1.

Example 3

A bright pigment of Example 3 has a configuration similar to that of the bright pigment of Example 1, except that the materials contained in the yellowing-suppressing coating are different.

The bright pigment of Example 3 was formed in the same way as in the bright pigment of Example 1, except for using 3.6 g of sodium molybdate(VI).dihydrate ($Na_2MoO_4.2H_2O$) in place of sodium tungstate. The thickness of the yellowing-suppressing coating containing at least one selected from the group consisting of a hydroxide of molybdenum, an oxide hydrate of molybdenum, and a metal salt of an oxide hydrate of molybdenum, and a phosphoric acid compound was 20 nm.

Example 4

A bright pigment of Example 4 has a configuration similar to that of the bright pigment of Example 3, except that the yellowing-suppressing coating does not contain a phosphoric acid compound.

The bright pigment of Example 4 was formed in the same way as in the case of the bright pigment of Example 1, except that the dropping of a phosphoric acid solution, which was performed simultaneously with the dropping of a molybdic acid solution, was not performed. The thickness of the yellowing-suppressing coating containing at least one selected from the group consisting of a hydroxide of molybdenum, an oxide hydrate of molybdenum, and a metal salt of an oxide hydrate of molybdenum was 15 nm.

Example 5

A bright pigment of Example 5 has a configuration similar to that of Example 1, except that the materials contained in the yellowing-suppressing coating are different.

The bright pigment of Example 5 was formed in the same way as in the case of the bright pigment of Example 1, except that 3.6 g of sodium(V) vanadate ($NaVO_3$) was used in place of sodium tungstate. The thickness of the yellowing-suppressing coating containing at least one selected from the group consisting of a hydroxide of vanadium, an oxide hydrate of vanadium, and a metal salt of an oxide hydrate of vanadium, and a phosphoric acid compound was 20 nm.

Example 6

A bright pigment of Example 6 has a configuration similar to that of the bright pigment of Example 1, except that the materials contained in the yellowing-suppressing coating are different.

The bright pigment of Example 6 was formed in the same way as in the case of the bright pigment of Example 1, except that 1.2 g of cerium(IV) diammonium nitrate ($Ce(NH_4)_2(NO_3)_6$) was used in place of sodium tungstate. The thickness of the yellowing-suppressing coating containing at least one selected from the group consisting of a hydroxide of cerium, an oxide hydrate of cerium, and a metal salt of an oxide hydrate of cerium, and a phosphoric acid compound was 20 nm.

Comparative Example 1

As a bright pigment of Comparative Example 1, METASHINE (Registered Trademark) PS series ME2025PS (manufactured by Nippon Sheet Glass Co., Ltd.) was prepared. ME2025PS has a configuration in which scaly glass (average particle size: 25 μm, average thickness: 1.3 μm) is covered with a silver coating (thickness: 20 nm to 60 nm).

Comparative Example 2

A bright pigment of Comparative Example 2 was formed in the same way as in the case of the bright pigment of Example 1, except that a yellowing-suppressing coating was not formed.

As described below, waterborne metallic paints respectively containing the bright pigments of Examples 1-6 and Comparative Examples 1-2 were prepared and applied to steel plates as described below, and weather resistance was evaluated by conducting the following accelerated weathering test.

(Preparation of a Resin for Waterborne Metallic Paint)

Seventy parts of butyl cellosolve, 40 parts of styrene monomer, 60 parts of methyl methacrylate monomer, 25 parts of methacrylic monomer, 45 parts of hydroxymethyl methacrylate monomer, 120 parts of butyl acrylate monomer, 3 parts of lauryl mercaptane, and 3 parts of azobisisobutylnitryl were placed in a reaction container and reacted at 120° C. with stirring, and the stirring was continued for one hour.

To the obtained mixture, 250 parts of pure water and 30 parts of dimethyl ethanol amine further were added, whereby an aqueous acrylic resin solution containing 45% of a non-volatile component and having a number average molecular weight of 5000 was obtained. The acid value and hydroxyl value in the resin were 60 and 65.

(Preparation of Waterborne Metallic Paint)

Thirty parts of the bright pigments of Examples 1-6 and Comparative Examples 1-2, and 40 parts of hexamethoxy methylol melamine as a cross-linking agent were mixed with 200 parts of the above-mentioned aqueous acrylic resin and stirred. The viscosity of the obtained mixture was adjusted with pure water, whereby waterborne metallic paint was obtained.

(Preparation of Waterborne clear Paint)

Twelve parts of methyl methacrylate monomer, 5 parts of methacrylic monomer, 15 parts of hydroxymethyl methacrylate monomer, 60 parts of butyl acrylate monomer, and 3 parts of lauryl mercaptane were placed in a reaction container and reacted at 120° C. with stirring, and thereafter, the stirring was continued for one hour.

Next, the obtained mixture was neutralized with dimethyl-ethanol amine, and the neutralized substance thus obtained was diluted further with pure water, whereby an aqueous acrylic resin solution with 40% of a non-volatile component was obtained. Hexamethoxymethylol melamine was added to the acrylic resin to adjust a solid content ratio to 40%, and the viscosity was adjusted with pure water, whereby waterborne clear paint was obtained.

(Production of a Test Coating Plate)

The above-mentioned waterborne metallic paint was applied, with an air spray, to a steel plate subjected to a zinc phosphate conversion treatment, cation electrodeposition, and intermediate coating in this order so that the thickness after drying became 20 μm, and the coating was dried at 80° C. for 10 minutes. Then, waterborne clear paint was applied to the coating with an air spray so that the thickness after drying became 30 μm, and the coating was allowed to stand for 10 minutes. The coating plate thus obtained was burnt at 150° C. for 30 minutes with a drier, whereby a test coating plate was produced.

(Method of an Accelerated Weathering Test)

The test coating plates covered with the waterborne metallic paints and the waterborne clear paints containing the bright pigments of Examples 1-6 and Comparative Examples 1-2 were subjected to an accelerated weathering test by Superxenon Weather Meter (SX75, manufactured by Suga Test Instruments Co., Ltd.). The test conditions were set to be as follows.

(Test Conditions)
Test time: 1200 hours
Light source: water-cool xenon
Filter: quartz+#295
Irradiation wavelength: 300 to 400 nm
Illuminance: 180 ($W/m^2$)
Black panel temperature: 63(° C.)
Humidity: 50±5 (% RH)
Irradiation method: continuous
Pure water spray: 18 minutes in 120 minutes
Number of rotations of a sample frame: 1/30 rotations/second (2 rpm)

(Evaluation Method)

Figure 3:
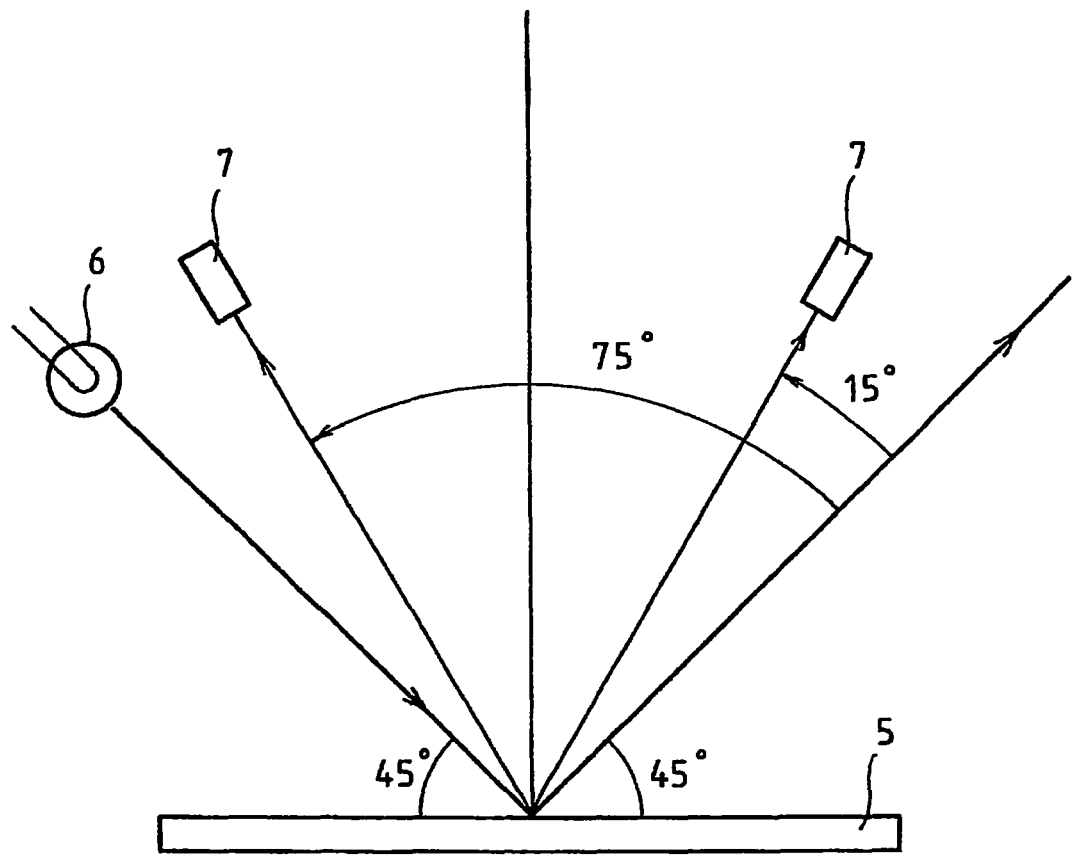
FIG. 3 is a diagram illustrating the measurement of a color tone of reflected light.

As shown in FIG. 3, an observation light source 6 was placed at a position where light was able to be incident upon the surface of a coating 5 at an angle of 45°. A D65 light source was used as the observation light source 6. Light was emitted from the observation light source 6 to measure the color tone of reflected light by a detector 7.

The detector 7 was placed at a position where the detector 7 was capable of receiving reflected light (the color tone of the reflected light will be referred to as a "highlight color tone") in a direction shifted by 15° from a direction of regular reflection of incident light (i.e., a direction at 45° with respect to the surface of the coating 5) to the observation light source side. The reason for this is as follows.

The amount of light reflected regularly from a bright pigment and a coating surface is too large. Therefore, the coloring of the bright pigment is difficult to understand. If the light at an angle shifted by 15° from the direction of regular reflection is observed, the influence by regular reflection from the coating surface is removed, which makes it easy to measure the color tone by the reflection of the bright pigment.

Table 1 shows the results of the color tone of reflected light before and after the accelerated weathering test. Furthermore, differences ΔL*, Δa, and Δb* were obtained from the values L*, a*, and b* before and after the accelerated weathering test. Furthermore, a chroma difference ΔC* and a color difference ΔE* were calculated from these values in accordance with the following expressions.

(Numerical Expressions)

$$\Delta C^* = \{(\Delta a^*)^2 + (\Delta b^*)^2\}^{1/2}$$

$$\Delta E^* = \{(\Delta L^*)2 + (\Delta a^*)2 + (\Delta b^*)2\}^{1/2}$$

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Color tone of reflected light before test |  |  |  |  |  |  |  |  |
| L* | 124.9 | 124.3 | 101.6 | 100.2 | 105.5 | 103.7 | 121.9 | 117.9 |
| a* | 0.4 | 0.6 | −0.2 | −0.4 | −0.5 | 0.9 | 0.3 | 0.7 |
| b* | 17.8 | 19.4 | 17.1 | 16.5 | 16.1 | 19.3 | 22.6 | 16.2 |
| Color tone of reflected light after passage of 1200 hours |  |  |  |  |  |  |  |  |
| L* | 124.1 | 123.8 | 101.3 | 99.7 | 104.9 | 103.4 | 120.8 | 115.0 |
| a* | 0.2 | 0.3 | −0.1 | 0.1 | −0.6 | 0.5 | 0.7 | 0.7 |
| b* | 17.5 | 19.6 | 17.5 | 15.6 | 16.3 | 20.4 | 28.0 | 27.8 |
| Difference in color tone of reflected light before and after test |  |  |  |  |  |  |  |  |
| ΔL* | 0.8 | 0.5 | 0.3 | 0.5 | 0.6 | 0.3 | 1.1 | 2.9 |
| Δa* | 0.2 | 0.3 | −0.1 | −0.5 | 0.1 | 0.4 | −0.4 | 0.0 |
| Δb* | 0.3 | −0.2 | −0.4 | 0.9 | −0.2 | −1.1 | −5.4 | −11.6 |
| Δc* | 0.4 | 0.4 | 0.4 | 1.0 | 0.2 | 1.2 | 5.4 | 11.6 |
| ΔE* | 0.9 | 0.6 | 0.5 | 1.1 | 0.6 | 1.2 | 5.5 | 12.0 |

As the value of L* is larger and the values of a*, b* are closer to 0, the color of reflected light is closer to white. Furthermore, as ΔL* is smaller, the decrease in luminance involved in the passage of time is smaller, and as the values of Δa*, Δb* are smaller, a change in color tone involved in the passage of time is smaller.

As is understood from the results shown in Table 1, in the coatings formed using the waterborne metallic paints containing the bright pigments of Examples 1-6, changes in luminance and color tone were small even after the above-mentioned accelerated weathering test. In contrast, the coatings formed using the waterborne metallic paints containing the bright pigments of Comparative Examples 1-2 changed greatly in luminance and color tone (in particular, Δb*) and were yellowed.

INDUSTRIAL APPLICABILITY

The bright pigment of the present invention can be used preferably as a component for ink, cosmetics, or the like using an alcohol-based solvent, as well as waterborne paint.

The waterborne paint containing the bright pigment of the present invention is useful as, for example, paint applied to a steel plate constituting automobiles and household electric appliances, paint applied to a plastic molding (housing) constituting OA appliances and household electric appliances, paint applied to construction materials such as exterior walls and siding boards, and paint applied to cans.

Ink containing the bright pigment of the present invention is useful as, for example, gravure ink printed onto films and wrapping paper, and flexographic ink printed onto corrugated cardboards, paper, and the like.

Examples of the cosmetics containing the bright pigment of the present invention include aqueous makeup cosmetics such as nail polish, emulsifiable eye shadow, powder eye shadow, a lipstick, aqueous mascara, or aqueous gel.

The invention claimed is:

1. A light-reflecting pigment, comprising:
   a scaly inorganic base that is a glass;
   a silver-containing coating that covers the inorganic base and comprises silver or a silver alloy; and
   a yellowing-suppressing coating that covers the inorganic base from outside of the silver-containing coating and comprises a metal compound functioning as an oxidizing agent,
   wherein the metal compound is at least one compound selected from the group consisting of a hydroxide of metal, an oxide hydrate of metal, and a salt of an oxide hydrate of metal, and the metal included in the metal compound is tungsten.

2. The light-reflecting pigment according to claim 1, wherein the yellowing-suppressing coating further comprises a phosphoric acid compound.

3. The light-reflecting pigment according to claim 1, further comprising a coating containing a phosphoric acid compound,
   wherein the coating covers the inorganic base from outside of the yellowing-suppressing coating and comprises a phosphoric acid compound.

4. The light-reflecting pigment according to claim 1, further comprising a protective coating that covers the inorganic base from outside of the yellowing-suppressing coating,
   wherein the protective coating comprises silica.

5. The light-reflecting pigment according to claim 4, wherein the protective coating is an outermost layer of the pigment.

6. The light-reflecting pigment according to claim 1, further comprising a coupling treatment layer that covers the inorganic base from outside of the yellowing-suppressing coating,
   wherein the coupling treatment layer comprises an organic compound having at least one functional group
   selected from the group consisting of a methacryloxy group, an epoxy group, an amino group, an alkoxyl group, a vinyl group, and an isocyanate group.

7. The light-reflecting pigment according to claim 6, wherein the organic compound is a coupling agent.

8. A waterborne resin composition comprising the light-reflecting pigment according to claim 1, a waterborne resin, and an alcohol-based solvent.

9. The waterborne resin composition according to claim 8, wherein the waterborne resin composition is paint, ink, a coating agent, an adhesive, or cosmetics.

10. A method for producing a light-reflecting pigment that reflects light from a surface thereof, comprising steps of:
    covering a surface of a scaly inorganic base with a silver-containing coating comprising silver or a silver alloy, the scaly inorganic base being a glass; and
    forming a yellowing-suppressing coating that covers the inorganic base from outside of the silver-containing coating,
    wherein the yellowing-suppressing coating comprises a metal compound functioning as an oxidizing agent,
    the metal compound is at least one compound selected from the group consisting of a hydroxide of metal, an oxide hydrate of metal, and a salt of an oxide hydrate of metal, and
    the metal included in the metal compound is tungsten.

11. The method for producing a light-reflecting pigment according to claim 10, wherein the yellowing-suppressing coating is formed by mixing a solution comprising at least one material selected from the group consisting of a salt of tungsten, and an acid of tungsten, with the inorganic base covered with the silver-containing coating, and washing the inorganic base covered with the silver-containing coating filtered from the solution with water, followed by drying.

12. The method for producing a light-reflecting pigment according to claim 11, wherein a phosphoric acid compound further is added to the solution to form the yellowing-suppressing coating so as to form a yellowing-suppressing coating further comprising a phosphoric acid compound.

13. The method for producing a light-reflecting pigment according to claim 10, further comprising a step of forming a coating comprising a phosphoric acid compound that covers the inorganic base from outside of the yellowing-suppressing coating.

14. The method for producing a light-reflecting pigment according to claim 10, further comprising a step of forming a protective coating that covers the inorganic base from outside of the yellowing-suppressing coating,
    wherein the protective coating comprises silica.

15. The method for producing a light-reflecting pigment according to claim 10, further comprising a step of forming a coupling treatment layer that covers the inorganic base from outside of the yellowing-suppressing coating,
    wherein the coupling treatment layer comprises an organic compound having a functional group, and
    the functional group of the organic compound is at least one functional group selected from the group consisting of a methacryloxy group, an epoxy group, an amino group, an alkoxyl group, a vinyl group, and an isocyanate group.

16. The method for producing a light-reflecting pigment according to claim 15, wherein the organic compound is a coupling agent.

17. A waterborne resin composition comprising the light-reflecting pigment according to claim 10, a waterborne resin, and an alcohol-based solvent.

* * * * *

UNITED STATES PATENT AND TRADEMARK OFFICE
CERTIFICATE OF CORRECTION

PATENT NO. : 9,045,643 B2  
APPLICATION NO. : 12/226507  
DATED : June 2, 2015  
INVENTOR(S) : Kitamura Page 1 of 1

It is certified that error appears in the above-identified patent and that said Letters Patent is hereby corrected as shown below:

On the title page item [52],

Page 2, column 1, line 1, delete "C01P2006/64" and insert -- C01P 2006/64 --.

In the specification,

Column 4, line 6, delete "a oxidizing" and insert -- an oxidizing --.

Column 4, line 54, delete "10" and insert -- 10 --.

Column 6, line 34, delete "($Bi_2O_3$." and insert -- ($Bi_2O_3$). --.

Column 12, line 11, delete "coarter" and insert -- coater --.

Column 13, line 35, delete "tugstate" and insert -- tungstate --.

Column 17, line 8, delete "$\Delta E^* = \{(\Delta L^*)2 + (\Delta a^*)_2 + (\Delta b^*)2\}^{1/2}$" and insert -- $\Delta E^* = \{(\Delta L^*)^2 + (\Delta a^*)^2 + (\Delta b^*)^2\}^{1/2}$ --.

Signed and Sealed this  
Sixteenth Day of February, 2016

Michelle K. Lee  
*Director of the United States Patent and Trademark Office*